Figure 1:
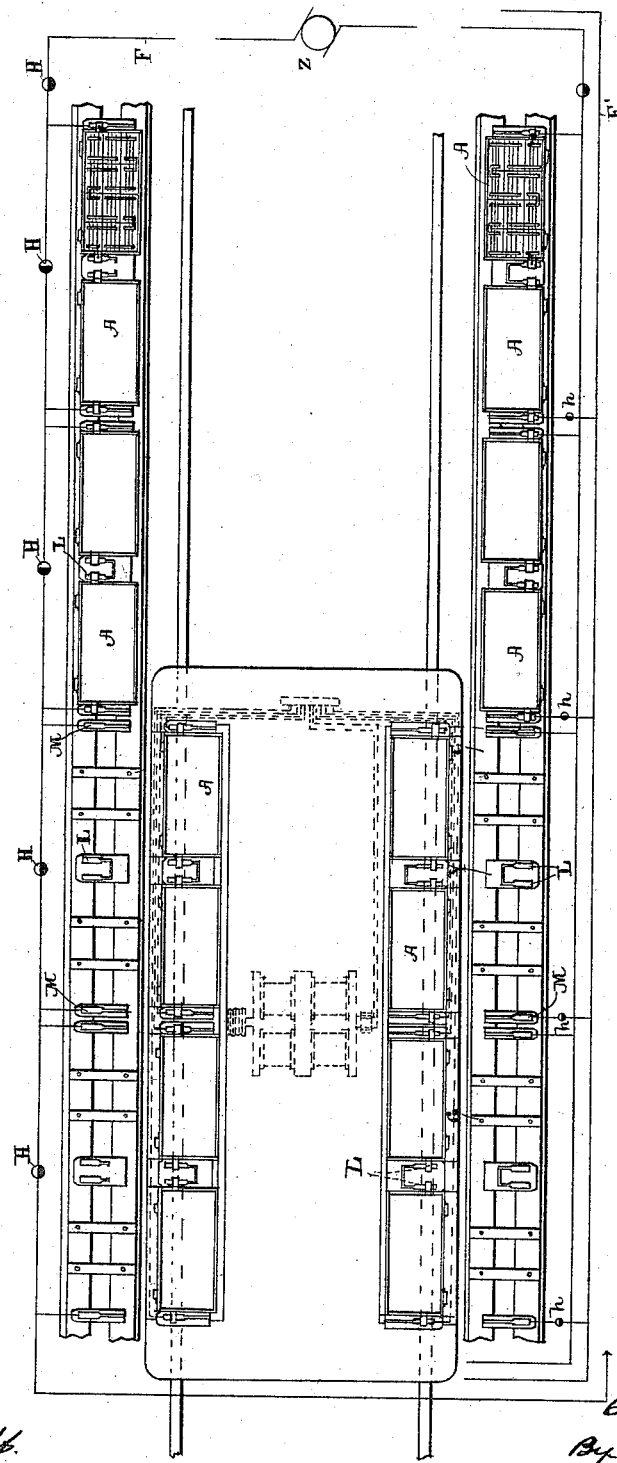
Figure 11:
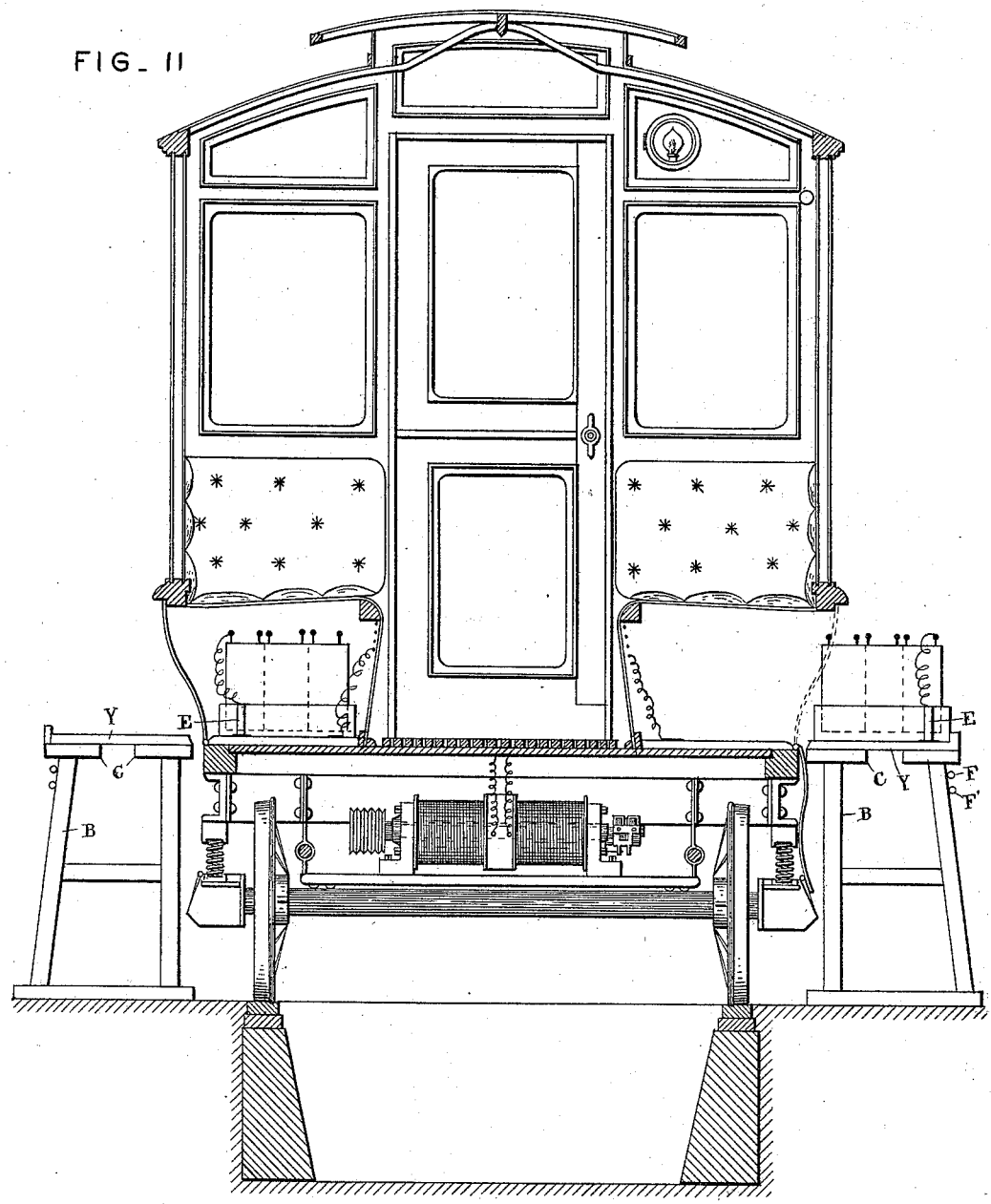

(No Model.) 7 Sheets—Sheet 1.

E. JULIEN.
BATTERY SYSTEM FOR ELECTRIC RAILWAYS.

No. 534,834. Patented Feb. 26, 1895.

Attest:
Edward Steer
H. B. Knight

Inventor:
Edmond Julien
By Dwight Bros
Attys (No Model.) 7 Sheets—Sheet 2.

E. JULIEN.
BATTERY SYSTEM FOR ELECTRIC RAILWAYS.

No. 534,834. Patented Feb. 26, 1895.

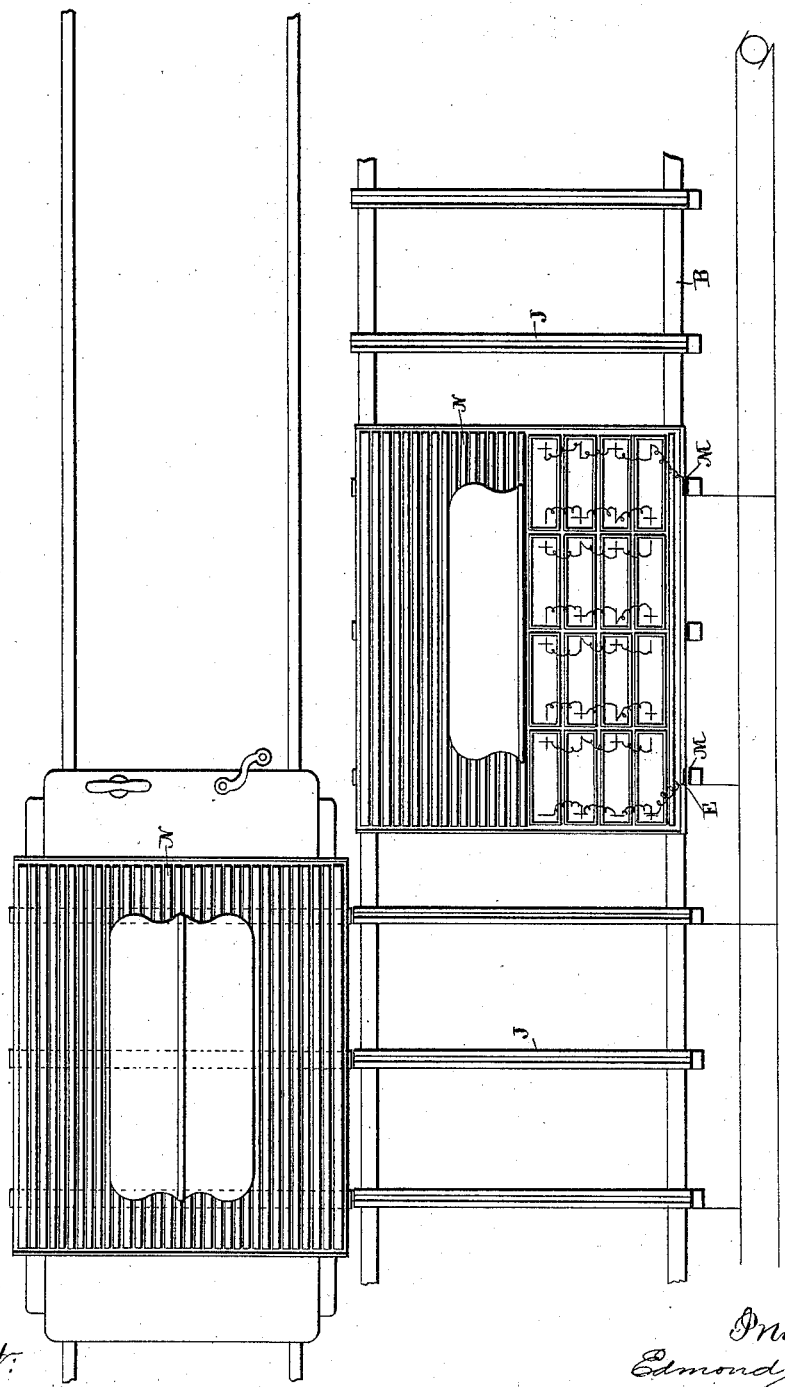

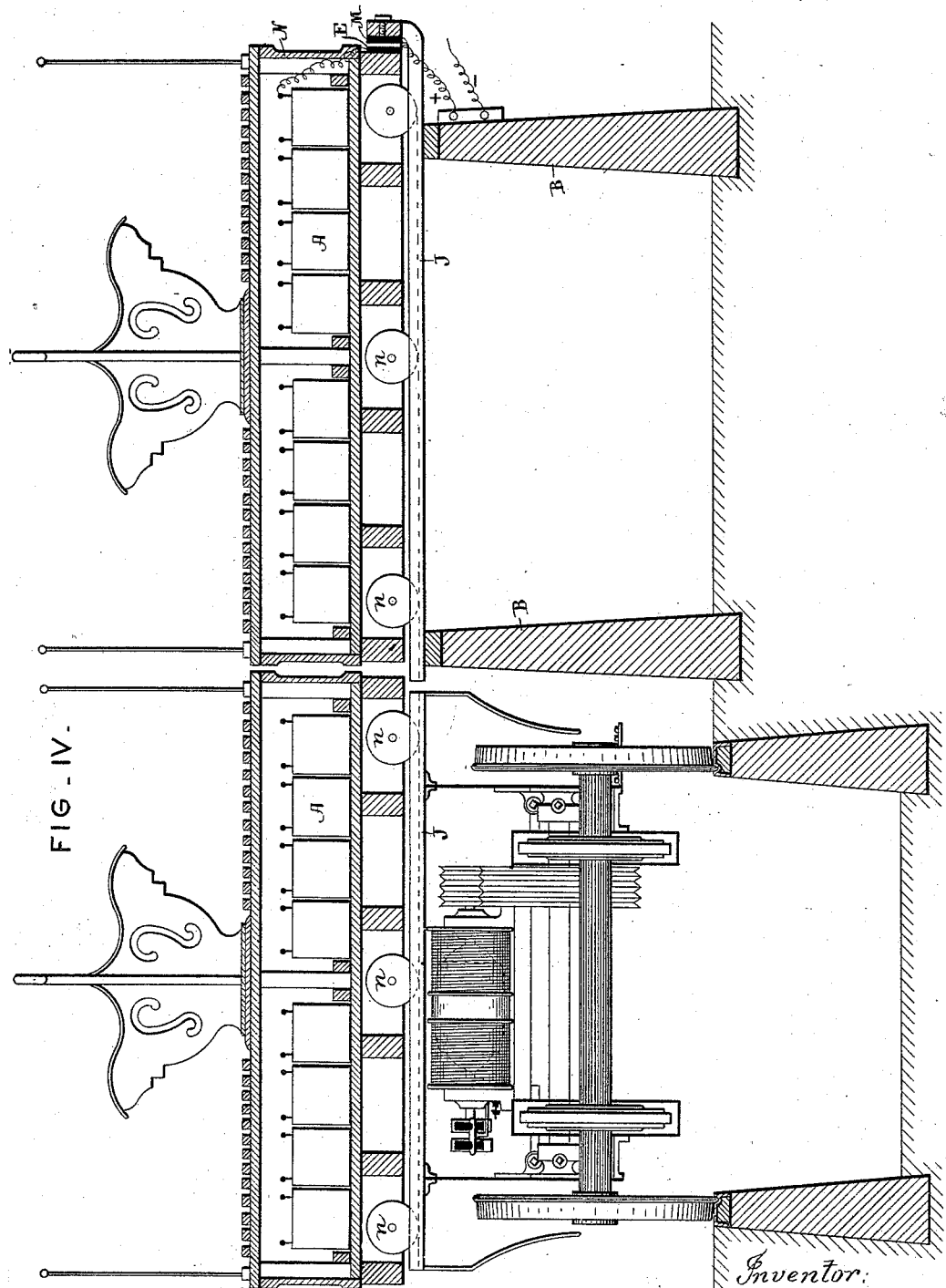

(No Model.) 7 Sheets—Sheet 5.
E. JULIEN.
BATTERY SYSTEM FOR ELECTRIC RAILWAYS.
No. 534,834. Patented Feb. 26, 1895.
FIG_V_
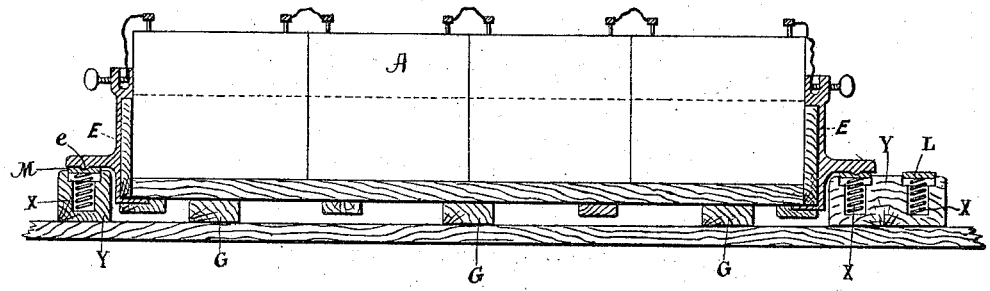
WITNESSES:
Edward Otes.
H. B. Knight
INVENTOR
Edmond Julien
BY Knight Bros
ATTORNEYS

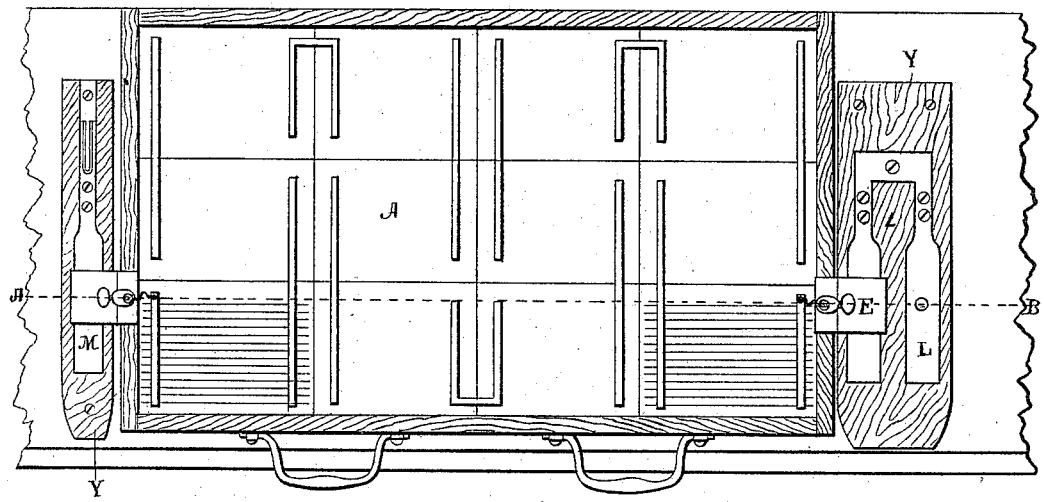

(No Model.) 7 Sheets—Sheet 7.
E. JULIEN.
BATTERY SYSTEM FOR ELECTRIC RAILWAYS.
No. 534,834. Patented Feb. 26, 1895.
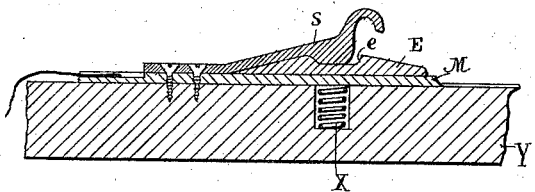
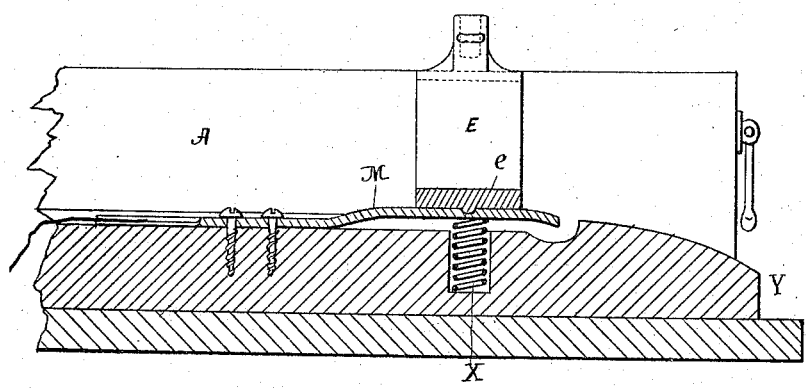

UNITED STATES PATENT OFFICE.

EDMOND JULIEN, OF BRUSSELS, BELGIUM, ASSIGNOR TO THE ELECTRIC STORAGE BATTERY COMPANY, OF GLOUCESTER, NEW JERSEY.

BATTERY SYSTEM FOR ELECTRIC RAILWAYS.

SPECIFICATION forming part of Letters Patent No. 534,834, dated February 26, 1895.

Application filed December 9, 1886. Serial No. 221,120. (No model.) Patented in England February 19, 1886, No. 2,470, and in Belgium November 19, 1886, No. 75,288.

*To all whom it may concern:*

Be it known that I, EDMOND JULIEN, a subject of the King of Belgium, residing at Brussels, Belgium, have invented certain Improvements in Systems of Electric Traction, (which are in part embodied in my English patent, No. 2,470, dated February 19, 1886, and Belgian patent, No. 75,288, dated November 19, 1886,) of which the following is a specification.

The object of the present invention is to complete the system described in my application for patent filed February 17, 1886, Serial No. 192,249.

In a system in which traction of vehicles is effected by means of piles or electric batteries, the replacing of the exhausted elements and the recharging thereof, require a special installation which will be the same whether or not the machine for charging the batteries be placed in proximity to such installation.

I will describe the means and combination of devices to be employed in a case requiring continuous service, such for example, as a tramway having self-propelling cars or locomotives to the motors of which the current is furnished by batteries of accumulators carried by the vehicles. The description is applicable in a general way to all systems in which traction is effected by means of electric batteries.

In order that the invention may be fully understood I will first describe it with reference to the accompanying drawings, referring to the claims for indication of the novel features.

In said drawings:—Figure I is a plan view of the installation showing two charging tables arranged at the desired distance from the two rails of a tramway. Fig. II is a transverse sectional view of a car on its track—one of the receptacles open and without accumulators—the other closed with accumulators in place. Fig. III represents in plan, and Fig. IV in vertical section the installation for charging when the invention is applied to a locomotive and the accumulators are carried in a box supported on rollers. Fig. V shows in section to an enlarged scale, on the line A—B, Fig. VI a drawer of accumulators in position with contact pieces together. Fig. VI is a plan view of the same. Fig. VII is a partial side elevation of the same. Fig. VIII is a detail sectional view showing one form of contact.

I will take as an example the case in which the replacing in the vehicle of the exhausted batteries should take place once a day—a condition which requires two "batteries"— that is to say "sets" of accumulators—one set being in service while the other is being charged.

In my application for patent above referred to, I stated that in my system the accumulators employed for electrically propelling vehicles, are placed in movable drawers having means for automatically completing contact and that they are introduced and withdrawn from the receptacles in the vehicle by a sliding or rolling movement. Each of these drawers contains a series of elements which may be or may not be independent of the others, according to the preferred mode of connection. To effect the charging of the batteries of these vehicles, thus divided into series A, I place along the outside of the two rails of a track a line of tables or piers B the top C of which is as nearly as possible in the same horizontal plane as the floor of the receptacles in the car for containing the accumulators as shown in Fig. II. The top C is furnished with contact pieces the preferred forms of which will be more fully understood on reference to Figs. V to VIII inclusive.

In Figs. V, VI and VII broad or bifurcated plates L are shown for effecting contact automatically with two series of the battery and narrow plates M for effecting such contact with a single series. With such an arrangement it will be seen that two of the series are so united that in a battery of eight drawers, there are but four series of accumulators. Springs X beneath the plates L, M, press the latter upward against the terminals E, of the batteries contained in drawers A when the drawers are placed in such position on the tables or piers or in the receptacles under the car seats as to effect this contact,—the completion of the circuit at this point taking place, automatically in either position. The contact surfaces of the pieces L, M, E, are preferably so formed as to engage one in the other to prevent the movement of the drawer of accumulators from its proper position. A boss e may for example be formed on the under side of terminal E to enter a depression in the plate L or M; or in the form shown in Fig. VIII the terminal E may have shoulders e to engage with shouldered steel springs s carried by the contact plates L, M, on the table B and the floor of the receptacle in the car body. The insulating strips Y on which the contact plates L, M, are mounted, serve as guides to direct the drawers in a proper path and insure contact between the said plates and the terminals of the battery conductors. The table is also furnished with slide strips G which receive the weight of the drawers and facilitate their movement and which may be lubricated.

In Fig. I the conductors, connected to the plates L, and receiving current from and returning it to a generator Z, are shown outside of the tables, but in practice they are placed against the tables as shown at F, F', Fig. II. It is to be noted that the said conductors can be arranged to charge all the accumulators in series as shown in Fig. I for the accumulators on one table or charge them by derived or parallel circuits as shown for the opposite table in the same figure. In any case the connections are made in such manner as to avoid any error or unnecessary manipulation, the series of each drawer entering into the charging or discharging circuit by the simple act of shifting onto the charging table or into the car receptacle. A drawer or any number of drawers while in place on the charging table may nevertheless be cut out of the circuit at any moment by means of an interrupter or switch placed at the proper point in the circuit. Thus in the system shown in Fig. I for charging in series, an interrupter H is placed in the circuit F for each sub-division of the battery to be charged. It is seen that the circuit around the batteries as shown, is open to force the current to pass through the batteries in place on the table, and closed at the sections from which the batteries have been moved.

In the other system, F', for charging by derived circuits it is necessary only to employ interrupters h for isolating each sub-division of the battery. All the expedients may be employed that are usual in similar circuits. The circuit should comprise means for preventing a return current from the battery to the machine. If the installation be of considerable length the conductors are so arranged that their resistance does not affect the conditions of charging when it is necessary that the current should be equal at all points. The ordinary devices for regulating the current may be employed.

In operating my system, when a car whose battery is partially or entirely exhausted, returns to the charging station, it is placed, with its side panels open, between two empty tables and its drawers are drawn out upon these tables thus automatically entering the charging circuit and being recharged for re-use. After the exhausted accumulators are removed, the car is pushed between two tables carrying drawers of charged accumulators and a new battery is pushed into the car at both sides, occupying the place of the drawers just removed and entering immediately the circuit of the car motor. Here its current is under control of a suitable regulator the preferred form of which I have described in a co-pending application, Serial No. 221,119, filed December 9, 1886. This double operation takes but a few moments and the vehicle is then ready for continued service.

By reference to Fig. II it will be seen that I provide between the rails, a trench which may extend a whole or only part of the length of the way and is made use of in inspecting those parts of the apparatus of the car placed beneath the floor of the latter.

When the invention is applied to locomotives,—understanding by this a vehicle intended primarily for propelling one or more separate cars,—the arrangement of the accumulators, removable through the sides of the vehicle, will be substantially the same as that above described for a self-acting car; but in such case I may, as shown in Figs. III and IV, mount the box or casing N containing the accumulators, on rollers n which, when the box leaves the car truck, travel on flanged rails J on piers B, which take the place of the charging tables already described. The circuits are completed automatically as in the case of the self-acting car, and when one battery or set of accumulators is exhausted, it is only necessary to run off the box or body of the locomotive onto the charging piers and replace it by a box containing freshly charged accumulators. A trench is employed in this as in the case already described, to enable inspection of the parts under the car.

I claim—

1. In a system of electric traction, the combination of a car, an electric circuit thereon, (comprising a motor, and poles or contact pieces,) a stationary charging bench or pier having its top level with the car floor, poles or contact pieces on the said bench or pier, drawers containing accumulators and bearing poles or contact pieces, and an exterior electric circuit comprising a stationary source of electricity and the said poles or contact pieces on the charging bench or pier, the whole being so arranged that the drawers when pushed onto the car automatically complete circuit with the motor and regulator and when drawn off the car on to the bench or pier automatically complete circuit with the source of electricity, for charging, substantially as set forth.

2. The combination of a car, an electric circuit thereon comprising a motor, and insulated spring contact plates or poles, a charging bench or pier having similar contact plates or poles, a drawer of accumulators having a pole or plate adapted to rest on and compress the spring of the poles on the car and bench, and an exterior charging circuit comprising a source of electricity, suitable switches, and the said poles or contact plates on the bench or pier, substantially as set forth.

3. The combination of a spring contact plate, a drawer containing battery cells having a terminal adapted to move over and in contact with said plate, a projection and a cavity on the meeting faces of said parts adapted to engage when the drawer is in position and thus secure the drawer in place as set forth.

4. In combination with a charging table and a number of drawers or boxes, of accumulators thereon, terminals on the said drawers or boxes connected with the accumulators and contact plates on the table having each independent connection with a charging circuit under control of a suitable interrupter or switch whereby any battery can be withdrawn from the charging circuit without affecting the others, substantially as set forth.

EDMOND JULIEN.

Attest:
HARRY E. KNIGHT,
H. S. KNIGHT.